United States Patent [19]

Chantriaux et al.

[11] Patent Number: 4,762,684
[45] Date of Patent: Aug. 9, 1988

[54] APPARATUS FOR DECOMPOSING SODIUM ALUMINATE LIQUORS WITHOUT AGITATION TO PRODUCE ALUMINA

[75] Inventors: Eric Chantriaux; Henri Grobelny, both of Provence; Yves Perret, Gardanne, all of France

[73] Assignee: Aluminium Pechiney, Paris, France

[21] Appl. No.: 3,046

[22] Filed: Jan. 13, 1987

Related U.S. Application Data

[62] Division of Ser. No. 831,269, Feb. 20, 1986, Pat. No. 4,666,687.

[30] Foreign Application Priority Data

Mar. 20, 1985 [FR] France ................ 85 04598

[51] Int. Cl.$^4$ ............................................. B01F 13/02
[52] U.S. Cl. .................................... 422/106; 366/106; 366/137; 366/191; 406/25; 406/84; 406/109; 406/143; 422/227
[58] Field of Search ............ 422/105, 106, 227; 406/24, 25, 83, 84, 109, 142, 143; 366/101, 106, 107, 137, 191

[56] References Cited

U.S. PATENT DOCUMENTS

| | | | |
|---|---|---|---|
| 1,073,878 | 9/1913 | Trent | 366/137 |
| 2,786,722 | 3/1957 | Lebeis, Jr. | 406/84 |
| 3,334,868 | 8/1967 | Lage | 366/101 |
| 3,351,326 | 11/1967 | Alberts et al. | 366/101 |
| 3,953,003 | 4/1976 | Máhig | 366/101 |
| 4,370,418 | 1/1983 | Koopman et al. | 422/106 |
| 4,630,931 | 12/1986 | Harsányi et al. | 366/107 |

FOREIGN PATENT DOCUMENTS 996195 6/1965 United Kingdom ............... 366/106

Primary Examiner—Barry S. Richman
Assistant Examiner—William R. Johnson
Attorney, Agent, or Firm—Dennison, Meserole, Pollack & Scheiner

[57] ABSTRACT

A method and apparatus for decomposing a sodium aluminate liquor supersaturated with alumina, obtained from alkaline action on bauxite by the Bayer process, is initiated by introduction of alumina trihydrate seed, thereby forming a suspension. The suspension is fed in at the top of a non-agitated reactor described as a "decomposer", and removed from the bottom of the decomposer; the speed at which the suspension moves downwardly is regulated at 1.5 to 10 meters per hour. The apparatus comprises a cylindrical-conical reactor which is fitted with an arrangement for feeding in the suspension at the top, and with an arrangement for taking out the suspension at the bottom. In one embodiment of the apparatus the suspension is taken from the base of the decomposer through an internal tube, with air injected into the bottom of it, is raised to the level of the top of the decomposer and is then sent downstream.

7 Claims, 2 Drawing Sheets

APPARATUS FOR DECOMPOSING SODIUM ALUMINATE LIQUORS WITHOUT AGITATION TO PRODUCE ALUMINA

This is a division of application Ser. No. 831,269 filed on Feb. 20, 1986 now U.S. Pat. No. 4,666,687 issued May 19, 1987.

BACKGROUND OF THE INVENTION

The invention concerns a method and apparatus for decomposing supersaturated sodium aluminate liquors, without agitation, the liquors being designed for the production of alumina by the BAYER process, which is the essential method of producing alumina chiefly for conversion to aluminum by high temperature electrolysis of a fused electrolyte. By this process the bauxite is treated with a hot aqueous sodium hydroxide solution at an appropriate concentration, thus making the alumina soluble and producing a supersaturated sodium aluminate solution. When the solid phase which constitutes the unattacked residue of the ore (red mud) has been separated, the supersaturated sodium aluminate solution is seeded with aluminum hydroxide, which acts as a trigger to bring about precipitation of the aluminum trihydroxide.

This operation, which is commonly described as "decomposition" in the art, generally takes place in several successive stages, which are distinguished chiefly by the temperature, particle size distribution and quantity of seed introduced, the arrangement for circulating the liquors in the successive tanks and possible recycling steps.

All industrial installations for making alumina by the BAYER process operating in the world to this day use agitated decomposers. Every precaution is taken in construction and utilization to avoid any stoppage of the agitation and circulation of the liquors, since this would result in an irreversible deposit of alumina trihydrate in the bottom of the tanks and the need to empty and chemically unblock them.

STATEMENT OF PROBLEM

It may as a matter of fact appear logical for decomposition to be carried out with agitation, both to ensure that the aluminum trihydroxide suspension in the aluminate liquor is homogeneous in some cases, and to prevent it from accumulating as block at the bottom of the decomposers.

However, the absence of agitation may have some advantages. Firstly, the decomposing speed of the aluminate liquor is increased by the very fact that the reaction takes place with a plug flow, which is known in the art to give a better kinetic performance than that obtained with a fully agitated homogeneous medium.

Secondly, from the point of view of quality, the absence of agitation enhances the process of agglomerating fine particles of aluminum trihydroxide together and thus helps to achieve a particle size distribution with the minimum of fine particles.

Finally, one can add that the energy expended in agitation is not negligible, whether the agitation is mechanical or produced by injecting air. The power required to maintain agitation, for volumes of the order of 1000 cubic meters, may be estimated as some tens of kilowatts per tank (for example 50-55 kw/1000 m$^3$).

PRIOR ART

Virtually no document can be found describing a method of operating, or constructing, apparatus for decomposing supersaturated "BAYER" aluminate solutions without agitation. At the most one can refer to French patent application No. FR-A-2 446 799 (which is equivalent to Canada No. 1,117,274). This describes a method of decomposition with only slight agitation, in which the aluminate liquor is introduced into the bottom of the decomposer by means of a rotating sprinkler tube fitted with perforated lateral arms, so that the introduction of the liquor does not cause any turbulence in the liquor being decomposed. The exhausted liquor is discharged by overflowing from the top of the decomposer, while the large grain trihydrate dispersion is recovered from the bottom. The process, in which the aluminate liquor circulates upwardly, may be compared to decomposition in a slightly agitated fluidized bed, and its application involves having the liquor circulating at a relatively lower speed.

OBJECT OF THE INVENTION

The object of the invention, which goes against accepted ideas and industrial practice, is the decomposition of a supersaturated sodium aluminate liquor, obtained from action on bauxites in the BAYER process, without any agitation.

More specifically, a first object of the invention is a method of decomposing a sodium aluminate liquor supersaturated with alumina and obtained from alkaline action on bauxite by the Bayer process. Decomposition is initiated by introducing alumina trihydrate triggers, thus forming an alumina trihydrate suspension in sodium aluminate, which will hereinafter be referred to as the "suspension". The process is characterized in that the suspension is introduced at the top of a non-agitated reactor described as the "decomposer" and is taken out from the bottom of the decomposer. In the alumina industry the volumes and flow rates currently used in decomposers lead to speeds of 1.5 to 19 meters per hour and preferably 3 to 7 meters per hour being chosen for the circulation of the suspension.

The second object of the invention is an apparatus for carrying out the decomposition process without any agitation. It is characterized in that it comprises a reactor fitted with means for introducing the suspension at the top and means for removing the suspension at the bottom; the reactor being cylindrical-conical in shape, and the means for removing the suspension being connected near the point of the conical portion.

The means for removing the aluminate suspension is a tube with a means for injecting pressurized air at the bottom and de-aerating box at the top, the de-aerating box being connected to piping for transfer to the next tank and a recycling overflow, the pipe optionally being provided with a discharge pump.

BRIEF DESCRIPTION OF THE DRAWING FIGURES

FIGS. 1 and 2 show the apparatus for carrying out the invention, in a diagrammatic vertical cross-section.

FIG. 1 further shows a decomposer, without agitator means, in accordance with the invention. FIG. 2 shows another embodiment of a decomposer in accordance with the invention.

DETAILED DESCRIPTION OF THE INVENTION

Figure 1:
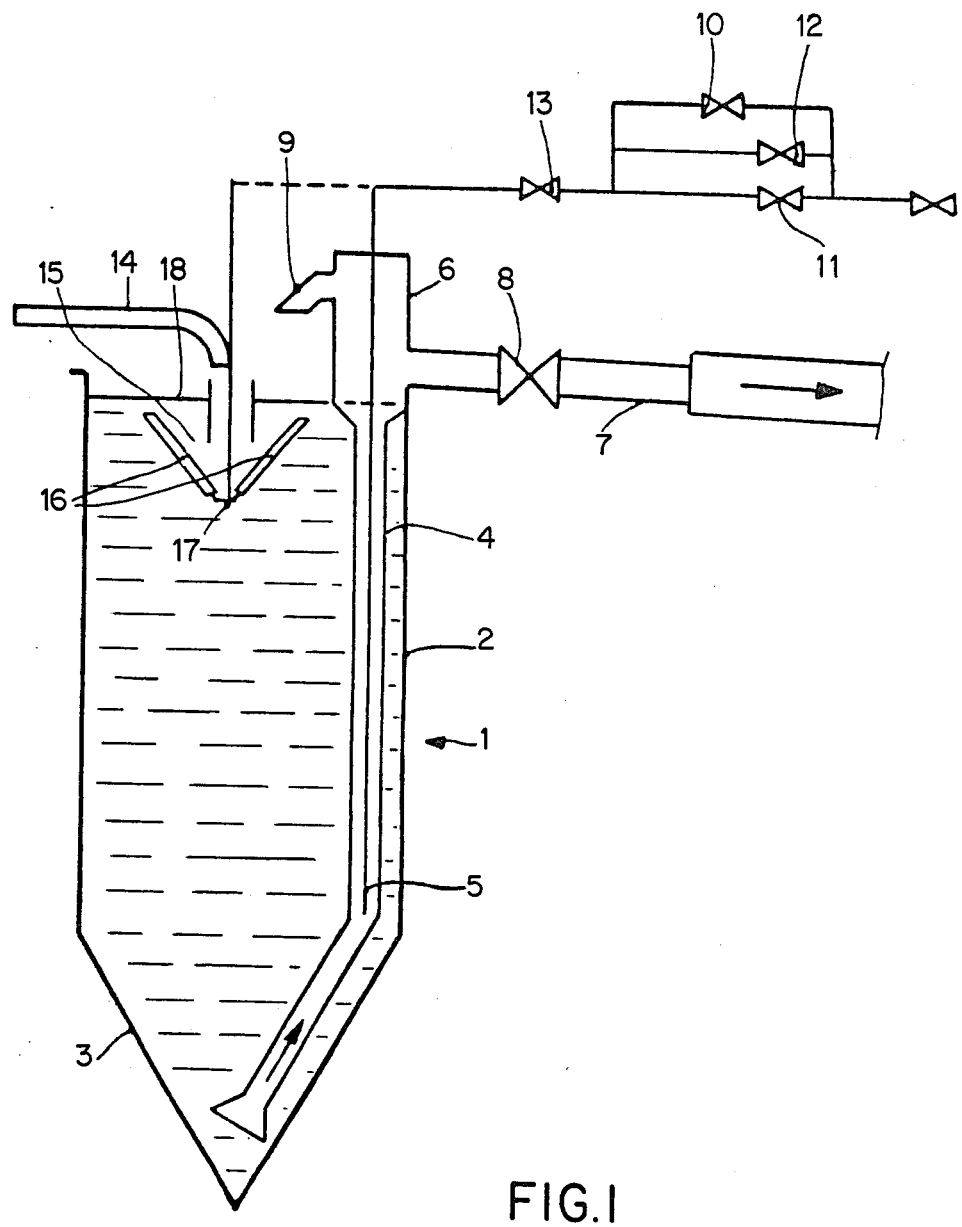
Figure 2:
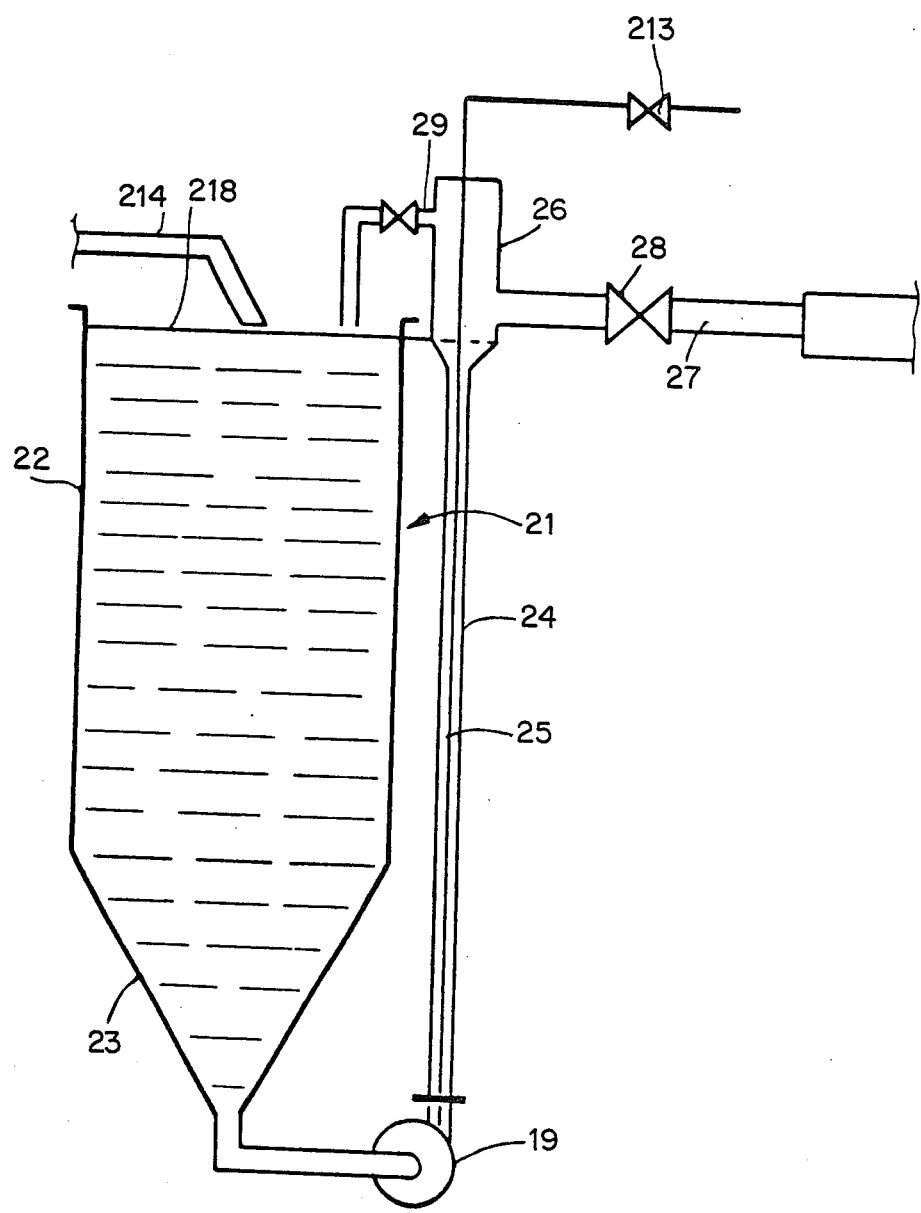

Elements of the decomposer apparatus of FIG. 2 are identified, similarly to those of FIG. 1, by provision of a prefix of 2.

The decomposers of FIGS. 1 and 2 comprise a cylindrical-conical tank 1,21 with a cylindrical upper portion 2,22 and a conical base 3,23. A plunger tube 4,24 draws up the suspension in the bottom of the core. The tube 4,24 is fitted with means for injecting compressed air 5,25, which creates an emulsified column in its vertical portion. The emulsified alumina hydrate suspension rises into the degassing box 6,26 and also serves to fill the downstream transfer piping 7,27. The piping is fitted with an isolating valve 8,28. The degassing box 6,26 further has an overflow 9,29 for return to the decomposer proper.

The flow rate of suspension transferred varies according to the flow rate of air injected through the tube 5,25. The flow of air is regulated at the tank level. This is complementary to a fixed flow of air which prevents the air injecting tube from being blocked and keeps the quantity transferred more regular. In the embodiment of FIG. 1 the fixed flow of air is controlled by the valve 10, while the remote controlled valve 11 regulates the flow of air according to the level of the aluminate suspension in the decomposer.

In case of the feed to the non-agitated tank terminating, the valve 8,28 installed on the transfer tube 7,27 closes automatically, while an air valve 12, see the embodiment of FIG. 1, also remote controlled, simultaneously opens in parallel with the two above-mentioned valves. The opening of the valve increases the amount of air injected to allow the suspension to be internally recycled onto the tank through the overflow 9,29 provided in the top of the de-aerating box 6,26, thereby preventing solid from accumulating irreversibly in the bottom of the tank. The circuit also includes at least one main stop valve 13,213.

The alumina trihydrate suspension arriving from the preceding tank through the pipe 14,214 is preferably distributed uniformly over the whole surface 18,218 of the decomposer by means of a spreader such as 15, see the embodiment of FIG. 1. This may, see FIG. 1, for example, be a series of small submerged tubes 16, which are inclined and supplied at the bottom with a small flow of compressed air fed in through the tube 17 so that they act as an emulsifier, or alternatively it may be any other equivalent means known in the art.

In the embodiment of FIG. 2 it will be seen that the suspension is taken from the bottom of the cone 23 through an external tube 24 and is moved upwards either by an air injecting tube 25 or by a pump 219. The top of the tube 24 is provided in all cases with a pipe system for recycling to the tank 21, and a tube 27 going downstream, with at least one isolating valve 28.

A sodium aluminate liquor is conventionally defined in the Bayer process by its concentration of caustic $Na_2O$ and its weight ratio WR, which is the ratio of the weight of alumina, expressed as $Al_2O_3$, to the weight of caustic soda. Caustic soda is taken to be the total quantity of $Na_2O$ in the sodium aluminate solution to be decomposed, in the bonded form of sodium aluminate and the free form of sodium hydroxide.

The liquor in the suspension which goes into the first decomposer generally has a weight ratio of approximately 1.05 to 1.10, with a caustic $Na_2O$ content of approximately 150 to 160 grams per liter.

The decomposer, which is fed at the surface and has the suspension extracted through the base, operates hydraulically with a slow flow known as a "plug flow". This slow flow does not create any agitation and enables a stable dynamic equilibrium to be established in the tank.

In a state of equilibrium each component horizontal section of liquor is found to have a weight ratio which is constant (but different for each section). The weight ratio develops in a downward direction, while remaining very close in all respects to the theoretical kinetics of conventional discontinuous decomposition (the so-called batch reaction).

EXAMPLES

1. In a first industrial installation comprising two decomposers in series, the invention is carried out under the following conditions:
Characteristics of each decomposing tank:
Volume = 1250 m$^3$
Height of cylindrical portion = 17 m
Height of conical portion = 9 m, angle at vertex 60°
Horizontal section = 63 m$^2$
Characteristics of suspension fed in:
sodium aluminate containing 150 g/l of caustic soda
dry materials = 720 g/l
particle size $D_{50}$ = 45 μm
temperature = 60° C.
Hydraulic and chemical characteristics:
First stage tank:
flow rate = 430 m$^3$/h
speed = 6.8 m/h
WR at inlet = 1.03
WR at outlet = 0.89
Duration of a run of decomposer apparatus between two chemical unblocking operations = 4 months, instead of 3 months, in a tank which is identical but where the suspension is agitated.
Second stage tank:
flow rate = 215 m$^3$/h
speed = 3.4 m/h
WR inlet = 0.89
WR outlet = 0.78
Duration of run of decomposer apparatus betwen two chemical unblocking operations: over 5 months, instead of 4 months in a tank where the suspension is agitated. (the WR at the outlet with an agitated tank would be 0.82).

2. In a second industrial installation with one decomposer the invention is carried out under the following conditions:
Characteristics of decomposing tank:
Volume = 3000 m$^3$
Height of cylindrical portion = 24 m
Height of conical portion = 10 m
Horizontal section = 113.5 m$^2$
Characteristics of suspension fed in:
sodium aluminate containing 165 g/l
dry materials = 650 g/l
particle size $D_{50}$ = 80 μm
temperature = 60° C.
Hydraulic characteristics:
speed = 3.1 m/h
flow rate = 350 m$^3$/h
WR inlet = 0.95
WR outlet = 0.82

ADVANTAGES OBTAINED WITH THE INVENTION

A. The gain in energy has already been mentioned above. Compared with an agitated decomposer emulsifying with air, which may require some tens of kilowatts for agitation and some ten $Nm^3$/min of air for emulsifying, all the agitating energy is saved and the consumption of air to raise the suspension in the tube 4,24 is reduced, according to the invention, to about 1 to 2 $Nm^3$/min. The cost of installing such a tank is much lower than that for a tank provided with an agitator.

B. Carrying forth of the process of the present invention is considerably easier than with an agitated decomposer.

The non-agitated decomposer is not subject to encrustation, or blocking of the base of the decomposer. The deposits on the walls of the tank are similar to those produced in agitated tanks.

The level of liquor to be decomposed in the tank can be regulated particularly easily, by adjusting the injection of air into the tube 4 or 24 and any recycling through the overflow 9 or 29, particularly in cases where the feed fluctuates or even stops altogether. In the event of a general electrical breakdown it is sufficient to have a small flow of compressed air to recycle the material and thus avoid irreversible deposits in the bottom of the tank. Such a breakdown is often disastrous in decomposers which are agitated mechanically or by the large volumes of compressed emulsifying air.

C. From the point of view of the process, the volume of the decomposer is utilized better for the progress of the reaction, without any agitation and with a flow in one direction, for two reasons:

1. There is no dead zone in the tank, and all its useful volume is utilized. In a tank which is agitated in the conventional way by emulsifying with air, the volume of air forming the emulsion is up to 10 to 15% of the total volume of the tank.

2. The reaction is systematic due to the plug-type flow.

For these various reasons the invention therefore provides a very marked improvement in processes for producing alumina continuously from Bayer liquors.

What is claimed is:

1. Apparatus for decomposing a sodium aluminate liquor supersaturated with alumina obtained from alkaline action on bauxite by the Bayer process, decomposition being initated by introduction of alumina trihydrate seed to the liquor, to trigger the decomposition by forming a suspension, without agitation, said apparatus comprising:

a cylindrical-conical reactor for containing the liquor to be decomposed, said reactor being cylindrical in an upper portion and conical in a lower portion, with the lower portion terminating in a tip defined at a lowermost portion of the reactor;

means for feeding the alumina trihydrate seed to the liquor at the upper portion of said reactor;

a tube having an upper end adjacent the upper portion of said reactor and a lower end adjacent the tip, wherein the lower end of said tube opens into the reactor at the lowermost portion of the reactor and the upper end of the tube is closed to the reactor;

means for injecting pressurized air in said tube in the vicinity of the lower end of said tube;

means connected to said tube proximate the upper end of said tube for removing suspension in the tube from said reactor without being returned to the reactor, said removing means including means for deaerating the suspension removed from the reactor.

2. The apparatus of claim 1, wherein said deaerating means includes overflow means for returning liquor overflow to said reactor.

3. The apparatus of claim 1, wherein said removing means includes means for transferring liquor to at least one further tank.

4. The apparatus of claim 1, wherein said tube is located substantially within said reactor.

5. The apparatus of claim 1, wherein said tube is located substantially outside said reactor.

6. The apparatus of claim 1, including means for spreading the seed substantially homogeneously over the whole exposed surface of liquor in the upper portion of the reactor.

7. The apparatus of claim 6, wherein the spreading means comprises a plurality of inclined tubes adapted to be submerged in liquor, arranged in the upper portion of the reactor; and means for providing a small flow of pressurized air for injection into liquor in the reactor from the bottom of said inclined tubes.

* * * * *